Dec. 23, 1941.         J. P. YOUNG         2,267,007
EMERGENCY SHUTOFF FOR FAUCETS
Filed May 4, 1940
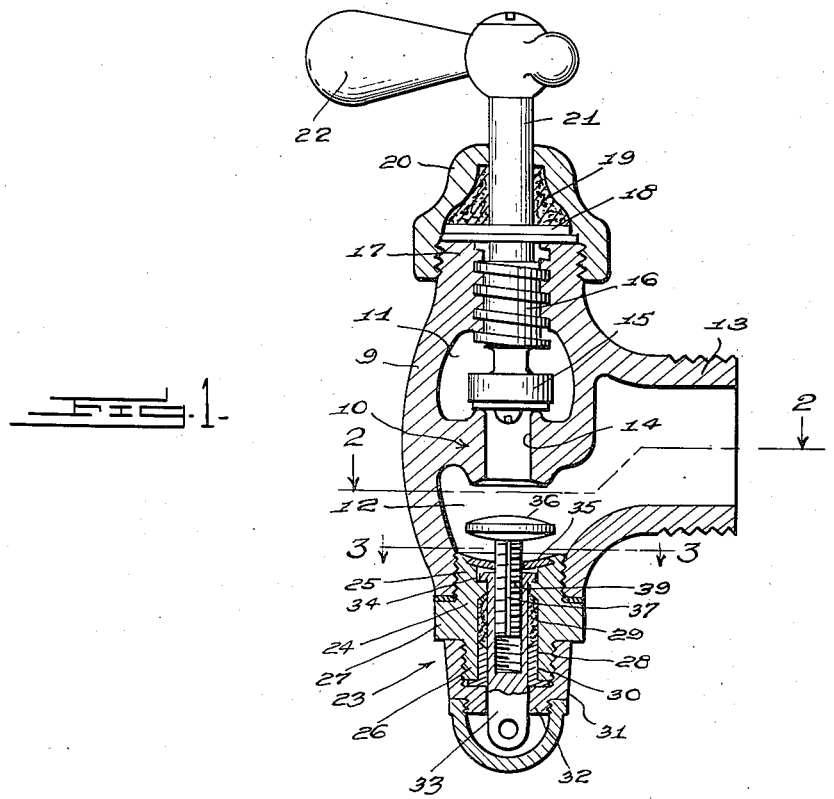
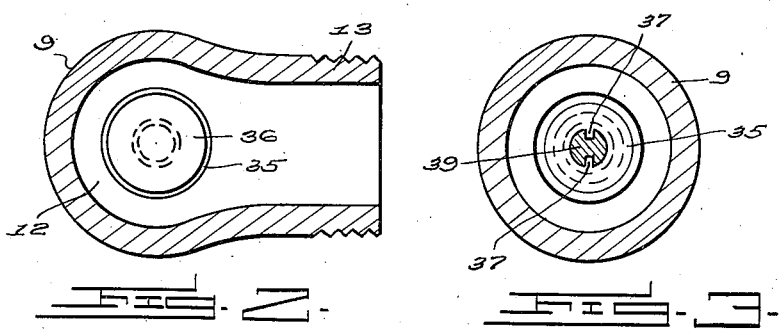
Inventor
JAMES P. YOUNG,
By *Clarence A. O'Brien*
Attorney Patented Dec. 23, 1941

2,267,007

UNITED STATES PATENT OFFICE 2,267,007

EMERGENCY SHUTOFF FOR FAUCETS

James P. Young, Paterson, N. J.

Application May 4, 1940, Serial No. 333,409

1 Claim. (Cl. 251—47)

This invention relates to new and useful improvements in faucets and more particularly to means permitting a shut-off of the water supply at the faucet, while the faucet is being disassembled for the purpose of repacking or replacement of parts.

An important object of the invention is to provide an emergency shut-off for faucets which can be readily operated immediately at the faucet in a convenient and practically effortless manner.

Other objects and advantages of the invention will become apparent to the reader of the following specification.

In the drawing—

Figure 1 is a vertical sectional view through one of the faucet structures.

Figure 2 is a section substantially on the line 2—2 of Figure 1.

Figure 3 is a section on the line 3—3 of Figure 1.

Referring to the drawing, it can be seen that the invention consists of a shell 9 having a horizontally disposed seat structure 10 at the intermediate portion thereof, dividing the shell into the upper chamber 11 and the lower chamber 12, the lower chamber 12 being in communication with the interior of the nipple 13, which extends rearwardly from the shell 9. The fluid passageway through the seat structure 10 is denoted by numeral 14 and is normally closed by a valve element 15 at the lower end of the screw shaft 16 which is operative vertically through the threaded bore 17 in the upper portion of the shell 9. On the top of the shell 9 is a packing plate 18 upon which packing 19 is disposed, this packing being located inside of the packing cap or gland 20 which is threadedly disposed over the upper end of the shell 9.

Rising from the screw shaft 16 is a stem 21 having a handle 22 at its upper end.

Normally, when the cap 20 is removed for the purpose of repacking the gland 20, the water supply to a number of faucets must necessarily be cut-off, throwing out of use those faucets.

In carrying out the present invention, emergency shut-off means generally referred to by numeral 23 is employed immediately at the particular faucet and this consists of a fitting 24 consisting of the threaded end portions 25 and 26 and the enlarged knurled intermediate portion 27. This fitting 24 is counterbored upwardly from its lower end as at 28 to receive packing 29 and the gland or plunger sleeve 30 for compressing the packing material 29. Threadedly disposed over the lower threaded end 26 of the fitting 24 is a cap 31 which bears against the lower end of the packing gland 20 to hold the same in packing compressed position.

The lower end of the cap 31 has a reduced threaded extension over which can be engaged the hemispherical shaped cap 32 into which protrudes the apertured lower end of a shaft 33, this shaft extending upwardly through the packing gland 30 and through the fitting 24 to terminate in a flanged upper end 34 which prevents downward movement of the shaft 33.

The upper end of the fitting 24 is counterbored and the side walls of this counterbore are grooved to the end, that a plate 35 can be flexed into the groove to act as a stop for the upper end of the shaft 33.

Numeral 36 denotes the emergency valve element which has a threaded stem extending downwardly therefrom and through an opening in the plate 35, and into the threaded bore of the shaft 33.

Obviously, by removing the cap 32, the shaft 33 can be reached. A pin or nail can be inserted through the opening in the shaft 33 and the shaft rotated so as to feed the valve element 36 upwardly or downwardly. When the valve element 36 is fed upwardly to abut the seat structure 10, the water supply to the chamber 11 is shut off.

It will be observed, that opposite sides of the stem of the valve 36 are longitudinally grooved to receive the lugs 37 which project inwardly from the plate 35, it being observed that the stem of the valve 36 is denoted by numeral 39.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a faucet structure, a shell, a seat structure in the shell, an emergency valve element, means whereby the emergency valve element can be operated against the seat cutting off fluid from passing through the shell, said emergency valve consisting of a valve element having a threaded shank, a fitting mounted in the lower portion of the shell, a rotary shaft mounted in the fitting and having a threaded bore for receiving the threaded stem of the emergency valve element, the inner end of the shaft being swivelly associated with the fitting, means whereby the shaft can be rotated, a packing gland in the fitting, a cap for the packing gland, said packing gland cap having a threaded extension and a second cap adapted to be disposed over the threaded extension to conceal the lower end of the shaft.

JAMES P. YOUNG.